United States Patent
Kodaira et al.

(10) Patent No.: US 12,124,732 B2
(45) Date of Patent: Oct. 22, 2024

(54) INFORMATION PROCESSING APPARATUS, DATA CONTROL METHOD, AND RECORDING MEDIUM FOR PARALLEL ACCESS OF PROCESSORS TO STORAGE AREAS

(71) Applicant: Hitachi, Ltd., Tokyo (JP)

(72) Inventors: Satoshi Kodaira, Tokyo (JP); Yusuke Yamamoto, Tokyo (JP); Yoshihide Shirai, Tokyo (JP)

(73) Assignee: Hitachi, LTD., Tokyo (JP)

( * ) Notice: Subject to any disclaimer, the term of this patent is extended or adjusted under 35 U.S.C. 154(b) by 7 days.

(21) Appl. No.: 18/116,683

(22) Filed: Mar. 2, 2023

(65) Prior Publication Data

US 2024/0160377 A1 May 16, 2024

(30) Foreign Application Priority Data

Nov. 11, 2022 (JP) .................................. 2022-181363

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0655; G06F 3/0604; G06F 3/0679; G06F 3/0613; G06F 3/0659; G06F 9/50; G06F 13/1652
See application file for complete search history.

(56) References Cited

U.S. PATENT DOCUMENTS

| 2019/0155596 | A1* | 5/2019 | Iwadate | .............. G06F 11/1433 |
| 2021/0089296 | A1* | 3/2021 | Banik | ................... G06F 9/4401 |
| 2022/0206780 | A1* | 6/2022 | Xiang | ................. G06F 15/7807 |
| 2023/0377735 | A1* | 11/2023 | Benz | ..................... G16H 40/67 |

FOREIGN PATENT DOCUMENTS

JP 2021-131710 A 9/2021

* cited by examiner

*Primary Examiner* — Khoa D Doan
*Assistant Examiner* — Tong B. Vo
(74) *Attorney, Agent, or Firm* — Procopio, Cory, Hargreaves & Savitch LLP

(57) ABSTRACT

An information processing apparatus includes a main CPU storage area and a sub-CPU storage area. The information processing apparatus further includes an FPGA capable of processing access to the main CPU storage area by a main CPU and access to the sub-CPU storage area by a second CPU in parallel. The FPGA has an FPGA control unit that performs processing. The FPGA control unit is configured to read prescribed data from an SPI device to the main CPU storage area and the sub-CPU storage area, update the prescribed data of the sub-CPU storage area when receiving an updating request from the sub-CPU, and read the prescribed data of the main CPU storage area to the main CPU when receiving a reading request from the main CPU.

8 Claims, 6 Drawing Sheets

FIG. 2

| isReading | Description |
|---|---|
| FALSE | Main CPU is not reading FW |
| TRUE | Main CPU is reading FW |

| isSameFW | Description |
|---|---|
| FALSE | Only sub-FW is updated |
| TRUE | Sub-FW is copied to main FW |

INFORMATION PROCESSING APPARATUS, DATA CONTROL METHOD, AND RECORDING MEDIUM FOR PARALLEL ACCESS OF PROCESSORS TO STORAGE AREAS

CROSS-REFERENCE TO PRIOR APPLICATION

This application relates to and claims the benefit of priority from Japanese Patent Application No. 2022-181363 filed on Nov. 11, 2022, the entire disclosure of which is incorporated herein by reference.

BACKGROUND

The present disclosure relates to a technology in a case in which data of one storage apparatus is used by a plurality of processors.

For example, a known information processing apparatus is of a type in which a plurality of processors access one SPI (Serial Peripheral Interface) device. In such a system, the processors need to occupy an SPI bus when accessing the SPI device, and exclusive control is performed using the SPI bus.

For example, Japanese Patent Application Laid-open No. 2021-131710 discloses a technology to perform, with the provision of a bus switch control unit that controls a bus switch, exclusive control with respect to a flash ROM by a plurality of CPUs under the control of the bus switch control unit.

SUMMARY

In the technology disclosed in Japanese Patent Application Laid-open No. 2021-131710, it is possible to perform the exclusive control of access to the flash ROM by the plurality of CPUs and appropriately use the flash ROM with the plurality of CPUs. However, in the exclusive control described in Japanese Patent Application Laid-open No. 2021-131710, another CPU is not allowed to access the flash ROM when one CPU accesses the flash ROM, which causes a relatively long waiting time.

The present disclosure has been made in view of the above circumstances and has an object of providing a technology with which it is possible to reduce a waiting time in a case in which one storage device is used by a plurality of processors.

In order to achieve the above object, an information processing apparatus according to an aspect includes: a first processor; a second processor; and a storage device configured to manage prescribed data used by the first processor. The information processing apparatus further includes a processing circuit having a first storage area accessible by the first processor and a second storage area accessible by the second processor and capable of processing access to the first storage area by the first processor and access to the second storage area by the second processor in parallel and accessing the storage device. The processing circuit has a control unit configured to perform processing, and the control unit is configured to read the prescribed data from the storage device to the first storage area and the second storage area, update the prescribed data of the second storage area when receiving an updating request of the prescribed data from the second processor, and read the prescribed data of the first storage area to the first processor when receiving a reading request of the prescribed data from the first processor.

According to the present disclosure, it is possible to reduce a waiting time in a case in which one storage device is used by a plurality of processors.

BRIEF DESCRIPTION OF THE DRAWINGS

FIG. 2 is a configuration diagram of a state management table according to an embodiment;

DETAILED DESCRIPTION OF THE EMBODIMENT

Embodiments will be described with reference to the drawings. Note that the following embodiments do not intend to limit the invention according to claims, and various elements and all the combinations of the elements described in the embodiments are not always essential for the solving means of the invention.

Note that information will be hereinafter described by an expression such as an "AAA table" but may be expressed by any data structure. That is, the "AAA table" may be called "AAA information" to indicate that information does not depend on a data structure.

Figure 1:
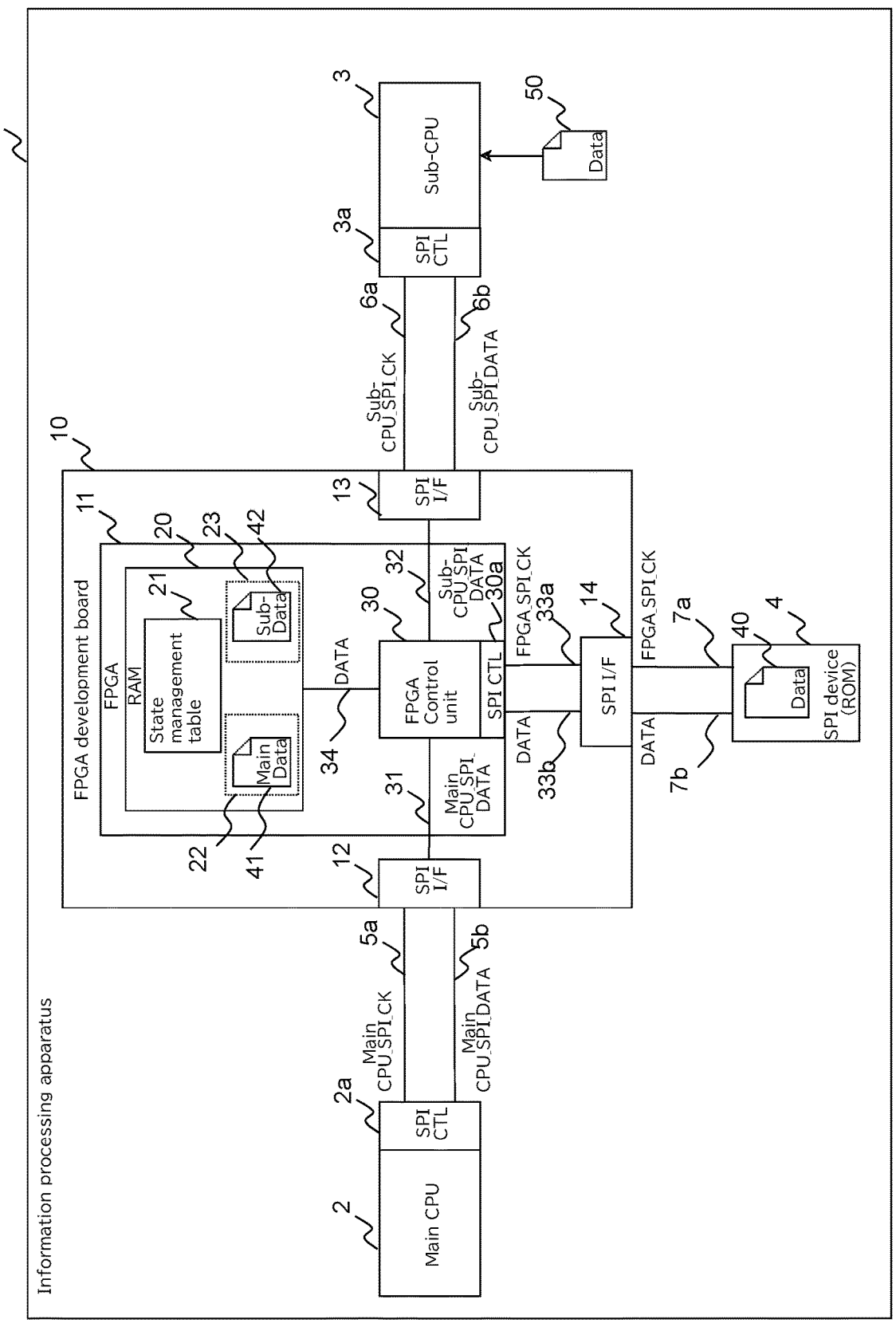
FIG. 1 is an entire configuration diagram of an information processing apparatus according to an embodiment.

FIG. 1 is an entire configuration diagram of an information processing apparatus according to an embodiment.

An information processing apparatus 1 is, for example, a general-purpose computer (computer), a storage apparatus, or the like and includes a main CPU 2 as an example of a first processor, a sub-CPU 3 as an example of a second processor, an SPI (Serial Peripheral Interface) device 4 as an example of a storage device, and an FPGA (Field Programmable Gate Array) development base 10.

The main CPU 2 and the FPGA development board 10 are coupled together via a signal line 5a for transmitting a clock and a signal line 5b for transmitting data. The sub-CPU 3 and the FPGA development board 10 are coupled together via a signal line 6a for transmitting a clock and a signal line 6b for transmitting data. The SPI device 4 and the FPGA development board 10 are coupled together via a signal line 7a for transmitting a clock and a signal line 7b for transmitting data.

The main CPU 2 performs various processing according to a program or the like. Further, the main CPU 2 functions as an SPI CTL 2a that controls communication with the FPGA development board 10 by an SPI. For example, In the case that the information processing apparatus 1 is a storage apparatus, the main CPU 2 performs control with respect to a storage device in the storage apparatus. Further, the main CPU 2 performs the control of hardware using data (for example, firmware (FW)) stored in the SPI device 4.

The sub-CPU 3 performs various processing according to a program or the like. Further, the sub-CPU 3 functions as an SPI CTL 3a that controls communication with the FPGA development board 10 by an SPI. For example, the sub-CPU 3 performs processing to receive update data 50 about data (for example, FW) used in the main CPU 2 via a network not shown and transmit the received update data 50 to the FPGA development board 10. Further, the sub-CPU 3 detects the abnormality of data used in the main CPU 2.

The SPI device 4 is, for example, a flash ROM (Read Only Memory) and stores prescribed data 40 (for example, FW) used in the main CPU 2. The SPI device 4 processes the access (writing and reading) of data with respect to the FPGA development board 10 through communication by an SPI.

The FPGA development board 10 includes an FPGA 11 as an example of a processing circuit and SPI interfaces (I/F) 12, 13, and 14. The FPGA 11 and the SPI I/F 12 are coupled together via a signal line 31 for transmitting data. The FPGA 11 and the SPI I/F 13 are coupled together via a signal line 32 for transmitting data. The FPGA 11 and the SPI I/F 14 are coupled together via a signal line 33*a* for transmitting a clock and a signal line 33*b* for transmitting data.

The SPI I/F 12 performs communication with the main CPU 2 by an SPI. The SPI I/F 13 performs communication with the sub-CPU 3 by an SPI. The SPI I/F 14 performs communication with the SPI device 4 by an SPI.

The FPGA 11 includes a RAM (RANDOM ACCESS MEMORY) 20 and an FPGA control unit 30. The RAM 20 and the FPGA control unit 30 are coupled together via a signal line 34 for transmitting data.

The RAM 20 stores a state management table 21. Further, the RAM 20 has a main CPU storage area 22 (first storage area) accessible from the main CPU 2 and a sub-CPU storage area 23 (second storage area) accessible from the sub-CPU 3. In the FPGA 11, access to the main CPU storage area 22 by the main CPU 2 and access to the sub-CPU storage area 23 by the sub-CPU 3 are executable in parallel. In the present embodiment, main data 41 (for example, FW) read by the main CPU 2 is stored in the main CPU storage area 22, and sub-data 42 stored by the sub-CPU 3 (for example, FW that is also called sub-FW when differentiated from another FW) is stored in the sub-CPU storage area 23.

The FPGA control unit 30 is coupled to the SPI I/F 12 via the signal line 31 for transmitting data, coupled to the SPI I/F 13 via the signal line 32 for transmitting data, coupled to the SPI I/F 14 via the signal line 33*a* for transmitting a clock and the signal line 33*b* for transmitting data, and coupled to the RAM 20 via the signal line 34 for transmitting data. The FPGA control unit 30 functions as an SPI CTL 30*a* that controls communication with the SPI device 4 by an SPI.

The FPGA control unit 30 controls the management processing of data by controlling access to the RAM 20 from the main CPU 2, access to the RAM 20 from the sub-CPU 3, access to the SPI device 4, or the like. The FPGA control unit 30 may be configured by executing a program.

Next, the state management table 21 will be described.

FIG. 2 is a configuration diagram of a state management table according to an embodiment.

The state management table 21 has the fields of isReading 21*a* and isSameFW 21*b*.

The isReading 21*a* stores information indicating whether the main CPU 2 is reading the FW of the main CPU storage area 22 of the RAM 20. Specifically, TRUE is stored in the isReading 21*a* when the main CPU 2 is reading the FW of the main CPU storage area 22 of the RAM 20, and FALSE is stored in the isReading 21*a* when the main CPU 2 is not reading the FW of the main CPU storage area 22 of the RAM 20.

The isSameFW 21*b* stores information indicating whether the FW of the main CPU storage area 22 of the RAM 20 and the FW of the sub-CPU storage area 23 (sub-FW) are the same. Specifically, FALSE is stored in the isSameFW 21*b* when the sub-FW of the sub-CPU storage area 23 is updated and different from the FW of the main CPU storage area 22, and TRUE is stored in the isSameFW 21*b* when the updated sub-FW of the sub-CPU storage area 23 is reflected in (copied to) the FW of the main CPU storage area 22.

Next, FW writing processing by the FPGA development board 10 will be described. The FW writing processing is processing to control the writing of FW transmitted from the sub-CPU 3.

Figure 3:
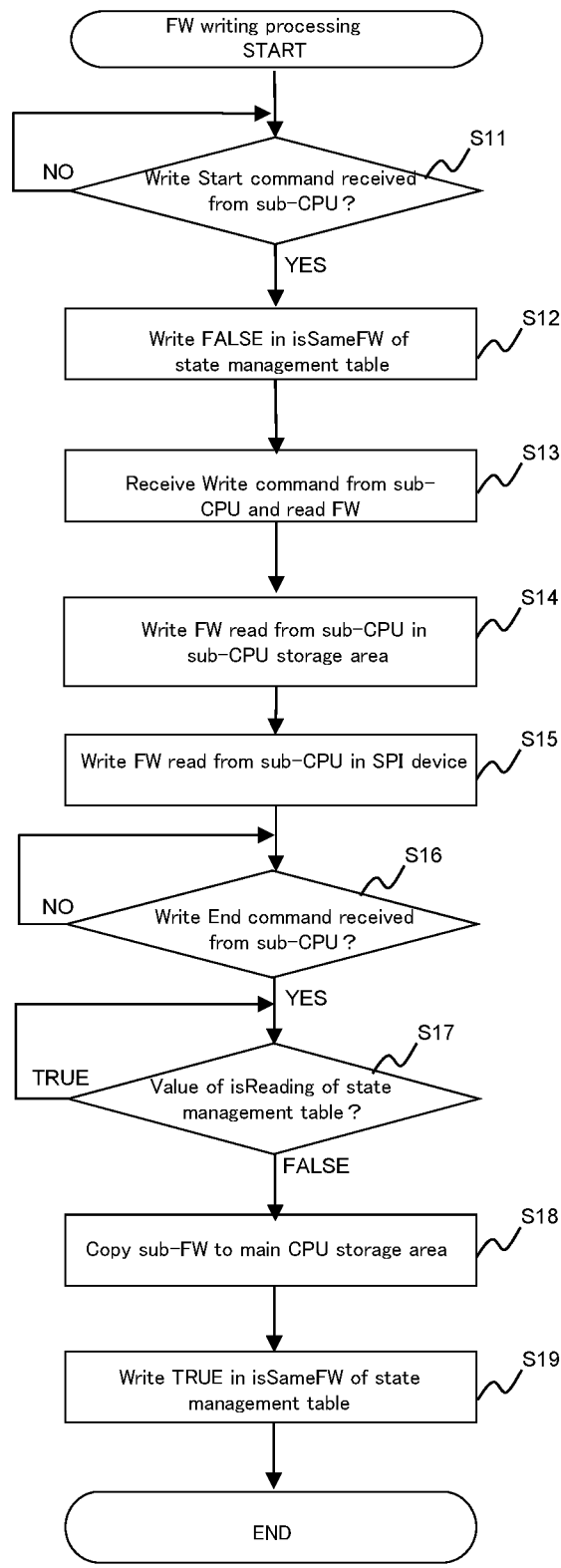
FIG. 3 is a flowchart of FW writing processing according to an embodiment.

FIG. 3 is a flowchart of the FW writing processing according to an embodiment.

First, the FPGA control unit 30 determines whether a Write Start command has been received from the sub-CPU 3 (S11). Here, the Write Start command is a command transmitted to start the writing of FW. The sub-CPU 3 transmits the Write Start command, for example, when the writing of the FW is needed such as when the new data of the FW is received, when the abnormality of the FW is detected, and when the update of the FW is instructed by a user.

As a result, the FPGA control unit 30 makes the processing proceed to step S11 when having not received the Write Start command from the sub-CPU 3 (S11: NO).

On the other hand, the FPGA control unit 30 writes FALSE in the isSameFW 21*b* of the state management table 21 (S12) when having received the Write Start command from the sub-CPU 3 (S11: YES).

Next, the FPGA control unit 30 reads the FW from the sub-CPU 3 (S13) when receiving a Write command (updating request) from the sub-CPU 3 and writes the read FW in the sub-CPU storage area 23 of the RAM 20 (S14).

Then, the FPGA control unit 30 writes the FW read from the sub-CPU 3 in the SPI device 4 (S15).

Next, the FPGA control unit 30 determines whether a Write End command has been received from the sub-CPU 3 (S16). Here, the Write End command is a command transmitted to complete the writing of the FW. The sub-CPU 3 transmits the Write End command when having entirely written the FW.

As a result, the FPGA control unit 30 makes the processing proceed to step S16 when having not received the Write End command from the sub-CPU 3 (S16: NO). On the other hand, the FPGA control unit 30 makes the processing proceed to step S17 when having received the Write End command from the sub-CPU 3 (S16: YES).

In step S17, the FPGA control unit 30 confirms the value of the isReading 21*a* of the state management table 21. When the value of the isReading 21*a* is TRUE (S17: TRUE), it is indicated that the main CPU 2 is reading the FW of the main CPU storage area 22. Therefore, the FPGA control unit 30 causes the processing to proceed to step S17 to wait for the end of reading the FW by the main CPU 2.

On the other hand, when the value of the isReading 21*a* is FALSE (S17: FALSE), it is indicated that the main CPU 2 is not reading the FW of the main CPU storage area 22 and the copying of the FW does not cause a problem. Therefore, the FPGA control unit 30 copies the FW of the sub-CPU storage area 23 to the main CPU storage area 22 (S18), writes TRUE in the isSameFW 21*b* of the state management table 21 (S19), and ends the processing.

According to the FW writing processing, the copy of FW from the sub-CPU storage area 23 to the main CPU storage area 22 is not performed when the main CPU 2 is reading the FW of the main CPU storage area 22 but is performed after the reading of the FW of the main CPU storage area 22 ends. Therefore, the reading of the FW by the main CPU 2 is not affected. Further, the copy of FW from the sub-CPU storage area 23 to the main CPU storage area 22 is a copy operation in the RAM. Therefore, for example, compared with a case in which FW is updated when a main CPU and a sub-CPU directly use the FW of an SPI device, it is possible to reduce a time to a large extent and reduce a waiting time for access even if the reading of FW by the main CPU 2 occurs during the copy of the FW from the sub-CPU storage area 23 to the main CPU storage area 22. For example, when an SPI device is directly used, it is necessary to take a time on the order of minutes to copy FW. On the other hand, it takes only a time on the order of 100 milliseconds and hardly needs a waiting time in the present embodiment.

Next, FW reading processing by the FPGA development board 10 will be described. The FW reading processing is processing to control the reading of FW from the main CPU 2.

Figure 4:
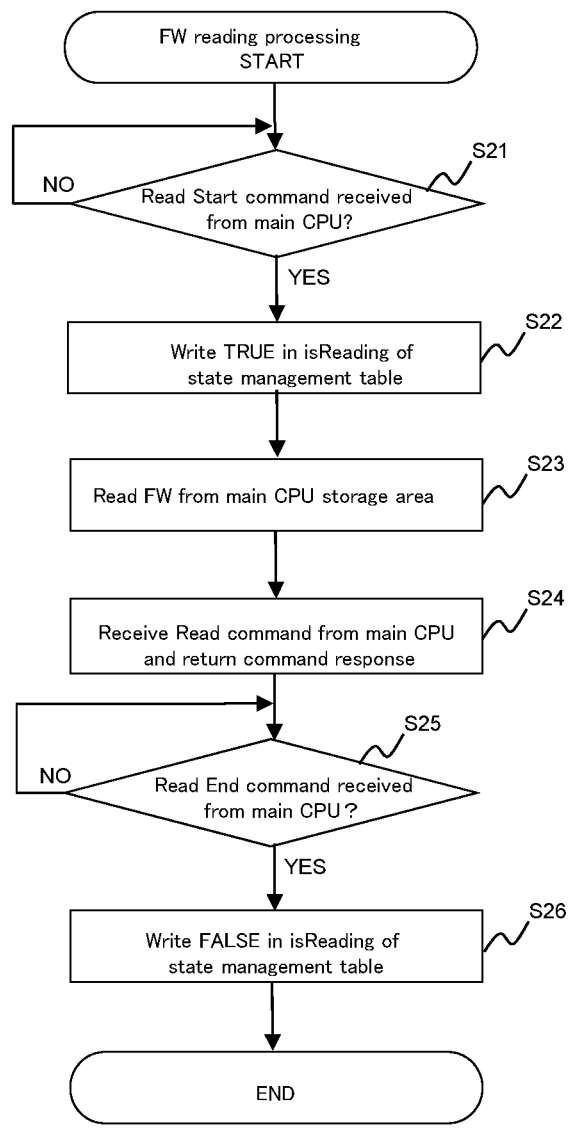
FIG. 4 is a flowchart of FW reading processing according to an embodiment.

FIG. 4 is a flowchart of the FW reading processing according to an embodiment.

First, the FPGA control unit 30 determines whether a Read Start command has been received from the main CPU 2 (S21). Here, the Read Start command is a command transmitted to start the reading of FW. The main CPU 2 transmits the Read Start command, for example, when the reading of the FW is needed such as when the main CPU 2 is activated and when the reading of the FW is instructed by a user.

As a result, the FPGA control unit 30 makes the processing proceed to step S21 when having not received the Read Start command from the main CPU 2 (S21: NO).

On the other hand, the FPGA control unit 30 writes TRUE in the isReading 21a of the state management table 21 (S22) when having received the Read Start command from the main CPU 2 (S21: YES).

Next, the FPGA control unit 30 reads FW from the main CPU storage area 22 (S23). When receiving a Read command (reading request) from the main CPU 2, the FPGA control unit 30 returns a response to the command, that is, the FW (S24).

Then, the FPGA control unit 30 determines whether a Read End command has been received from the main CPU 2 (S25). Here, the Read End command is a command transmitted to complete the reading of the FW. The main CPU 2 transmits the Read End command when having entirely read the FW.

As a result, the FPGA control unit 30 makes the processing proceed to step S25 when having not received the Read End command from the main CPU 2 (S25: NO).

On the other hand, the FPGA control unit 30 writes FALSE in the isReading 21a of the state management table 21 (S26) when having received the Read End command from the main CPU 2 (S25: YES) and ends the processing.

According to the FW reading processing, it is possible to appropriately reflect a state in which the main CPU 2 is reading the FW of the main CPU storage area 22 into the state management table 21 and appropriately perform exclusive control with respect to the main CPU storage area 22.

Next, processing by the information processing apparatus 1 will be described.

First, an example of the processing by the information processing apparatus 1 will be described.

Figure 5:
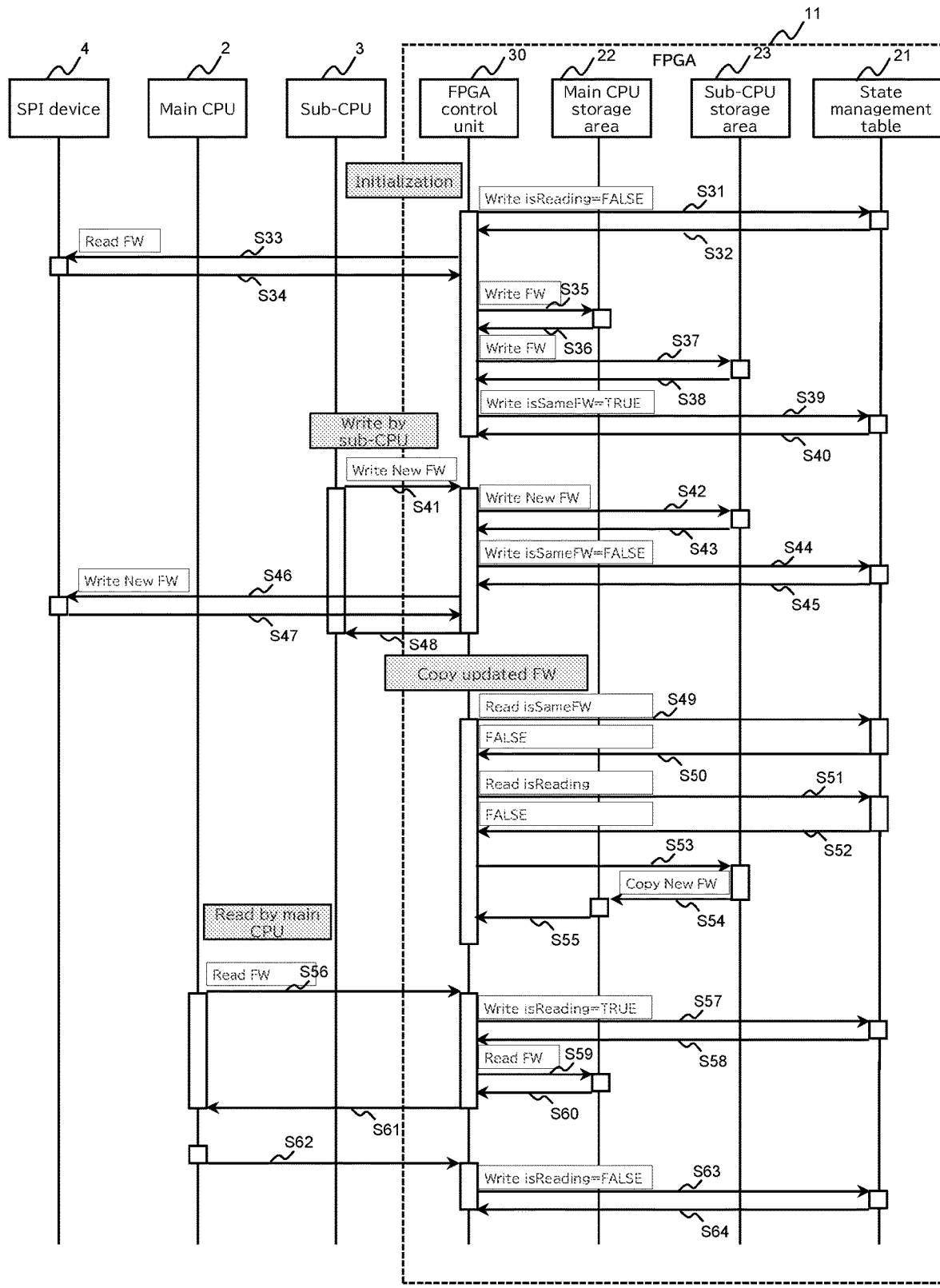
FIG. 5 is a sequence diagram of an example of processing by the information processing apparatus according to an embodiment.

FIG. 5 is a sequence diagram of an example of the processing by the information processing apparatus according to an embodiment. FIG. 5 is the sequence of the processing that is performed immediately after the power supply of the information processing apparatus 1 is turned ON, wherein the reading of FW by the main CPU 2 and the writing of FW by the sub-CPU 3 do not compete with each other.

First, the FPGA 11 performs initialization processing (steps S31 to S40). Specifically, the FPGA control unit 30 writes FALSE in the isReading 21a of the state management table 21 (S31) and receives a response to the writing (S32).

Next, the FPGA control unit 30 makes a request to read FW from the SPI device 4 (S33) and receives the FW from the SPI device 4 (S34).

Then, the FPGA control unit 30 writes the FW in the main CPU storage area 22 (S35), receives a response to the writing (S36), writes the FW in the sub-CPU storage area 23 (S37), receives a response to the writing (S38), writes TRUE in the isSameFW 21b of the state management table 21 (S39), and receives a response to the writing (S40). By the initialization processing, the FW stored in the SPI device 4 is written in the main CPU storage area 22 and the sub-CPU storage area 23, and the main CPU 2 and the sub-CPU 3 are enabled to independently access the FW.

Next, processing to write new FW (updated FW: New FW) of the sub-CPU 3 (S41 to S48) is performed. The processing is started when the sub-CPU 3 transmits the updated FW to the FPGA control unit 30 to be written (S41).

In response to this, the FPGA control unit 30 writes the updated FW in the sub-CPU storage area 23 (S42), receives a response to the writing (S43), writes FALSE in the isSameFW 21b of the state management table 21 (S44), and receives a response to the writing (S45).

Then, the FPGA control unit 30 writes the updated FW in the SPI device 4 (S46), receives a response to the writing (S47), and returns a response indicating the end of the writing to the sub-CPU 3 (S48). According to the processing, the updated FW is written in the SPI device 4.

Next, the FPGA 11 performs updated FW copy processing (steps S49 to S55) to copy the updated FW. Specifically, the FPGA control unit 30 makes a request to read the value of the isSameFW 21b of the state management table 21 (S49) and receives a response (FALSE in this case) to the request (S50).

When receiving the response indicating that the value of the isSameFW 21b is FALSE, as the updated FW is need to be copied to the main CPU storage area 22, the FPGA control unit 30 makes a request to read the value of the isReading 21a of the state management table 21 (S51) and receives a response (FALSE in this case) to the request (S52).

When receiving the response indicating that the value of the isReading 21a is FALSE, the FPGA control unit 30 requests to copy the updated FW to the sub-CPU storage area 23 (S53), causes the updated FW to be copied from the sub-CPU storage area 23 to the main CPU storage area 22 (S54), and receives the result of the copy (S55).

Then, processing to read the FW (S56 to S64) is performed. The processing is started when the main CPU 2 transmits the reading request of the FW to the FPGA control unit 30 (S56).

In response to this, the FPGA control unit 30 writes TRUE in the isReading 21a of the state management table 21 (S57) and receives a response to the writing (S58).

Next, the FPGA control unit 30 reads the FW from the main CPU storage area 22 (S59), receives a response (FW) to the reading (S60), and returns the response to the reading request, that is, the FW to the main CPU 2 (S61).

In response to this, the main CPU 2 transmits the fact that the reading of the FW (Read End command) has been completed to the FPGA control unit 30 (S62). In response to this, the FPGA control unit 30 writes FALSE in the isReading 21*a* of the state management table 21 (S63) and receives a response to the writing (S64).

Next, another example of the processing by the information processing apparatus 1 will be described.

Figure 6:
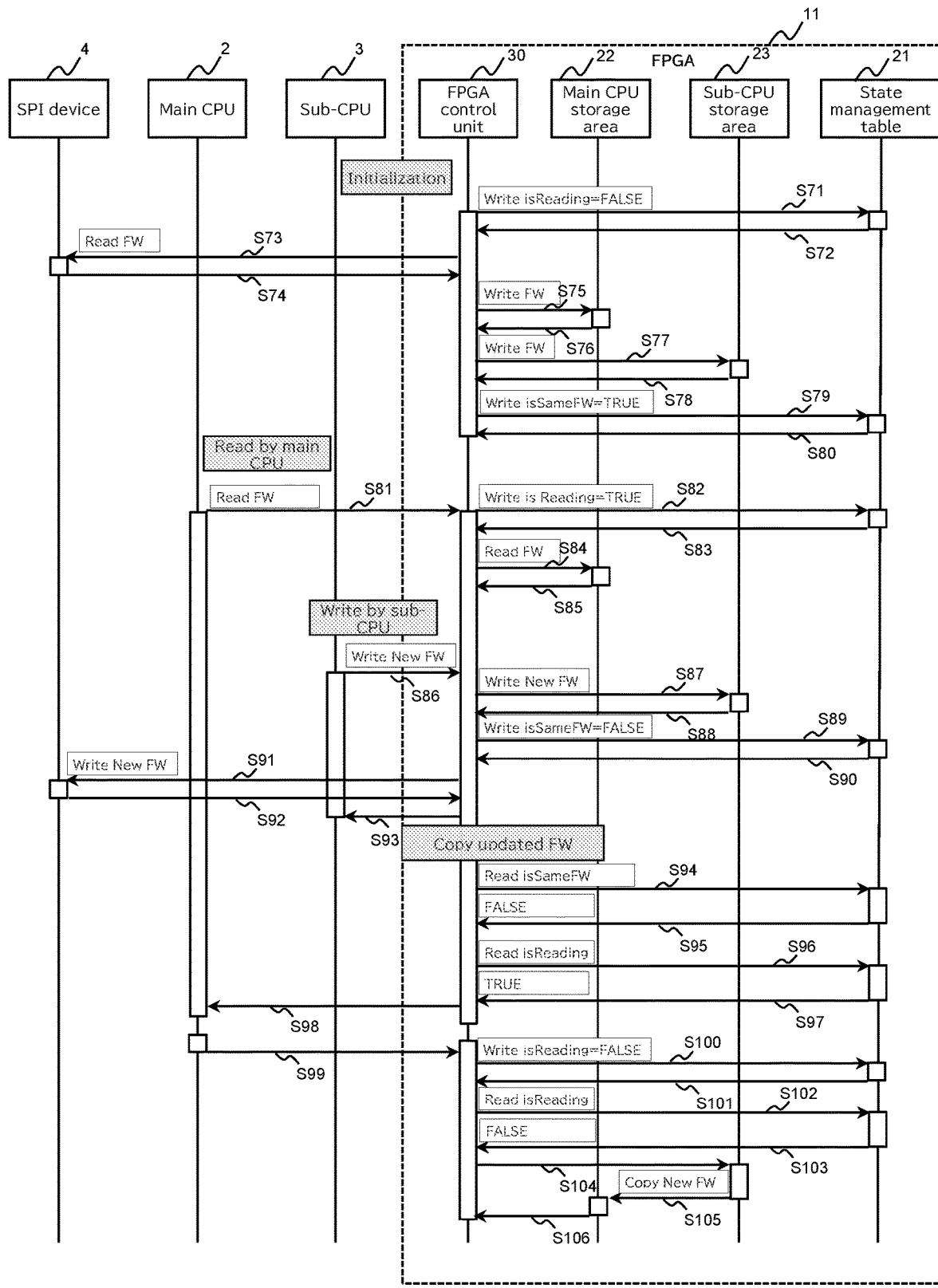
FIG. 6 is a sequence diagram of another example of the processing by the information processing apparatus according to an embodiment.

FIG. 6 is a sequence diagram of another example of the processing by the information processing apparatus according to an embodiment. FIG. 6 is the sequence of the processing that is performed immediately after the power supply of the information processing apparatus 1 is turned ON, wherein the reading of FW by the main CPU 2 and the writing of FW by the sub-CPU 3 compete with each other.

First, the FPGA 11 performs initialization processing (steps S71 to S80). The initialization processing is the same as the initialization processing (steps S31 to S40) of FIG. 5.

Next, the main CPU 2 starts processing to read FW (S81 to S85 and S98 to S101). The processing is started when the main CPU 2 transmits the reading request of the FW to the FPGA control unit 30 (S81).

In response to this, the FPGA control unit 30 writes TRUE in the isReading 21*a* of the state management table 21 (S82) and receives a response to the writing (S83).

Then, the FPGA control unit 30 reads the FW from the main CPU storage area 22 (S84) and receives a response (FW) to the reading (S85).

Here, processing to write updated FW by the sub-CPU 3 (S86 to S93) is started. The processing is started when the sub-CPU 3 transmits the updated FW to the FPGA control unit 30 to be written (S86).

The processing to write the updated FW (S86 to S93) is the same as the initialization processing (steps S41 to S48) of FIG. 5. According to the processing, the updated FW is written in the SPI device 4.

Then, the FPGA 11 starts updated FW copy processing (processing after step S94) to copy the updated FW. Specifically, the FPGA control unit 30 makes a request to read the value of the isSameFW 21*b* of the state management table 21 (S94) and receives a response (FALSE in this case) to the request (S95).

When receiving the response indicating that the value of the isSameFW 21*b* is FALSE, the FPGA control unit 30 makes a request to read the value of the isReading 21*a* of the state management table 21 (S96) and receives a response (TRUE in this case) to the request (S97). Here, since the value of the isReading 21*a* is TRUE and the main CPU 2 is reading the FW from the main CPU storage area 22, the FPGA control unit 30 waits for the copying of the FW to the main CPU storage area 22 (S17 of FIG. 3). After that, when the FPGA control unit 30 returns the FW received in step S85 to the main CPU 2 (S98), the main CPU 2 transmits the fact that the reading of the FW (Read End command) has been completed to the FPGA control unit 30 (S99). In response to this, the FPGA control unit 30 writes FALSE in the isReading 21*a* of the state management table 21 (S100) and receives a response to the writing (S101). Thus, the processing to read the FW by the main CPU 2 ends.

As described above, after the processing to read the FW by the main CPU 2 ends, the FPGA control unit 30 makes a request to read the value of the isReading 21*a* of the state management table 21 (S102) and receives a response (FALSE in this case) to the reading (S103).

As described above, since it is indicated that the main CPU 2 is not reading the FW from the main CPU storage area 22 when the result FALSE is received as a response, the FPGA control unit 30 instructs the sub-CPU storage area 23 to copy the updated FW (S104), causes the updated FW to be copied from the sub-CPU storage area 23 to the main CPU storage area 22 (S105), and receives the result of the copy (S106). Thus, it is possible to copy the updated FW to the main CPU storage area 22.

Note that the present invention is not limited to the embodiments described above but may be appropriately deformed to be carried out without departing from its gist.

For example, the FPGA control unit 30 of the FPGA 11 may be configured by a processor executing a program in the embodiments. Further, the FPGA control unit 30 may be performed by a hardware circuit having a fixed circuit that performs the same processing. Further, a program constituting the FPGA control unit 30 or a program executed by a processor may be installed from a program source. The program source may be a program distribution server or a recording medium (for example, a transportable recording medium).

What is claimed is:

1. An information processing apparatus comprising:
   a first processor;
   a second processor; and
   a storage device configured to manage prescribed data used by the first processor, wherein
   the information processing apparatus further includes:
   a processing circuit having:
     a first storage area accessible by the first processor;
     a second storage area accessible by the second processor and capable of processing access to the first storage area by the first processor and access to the second storage area by the second processor in parallel and accessing the storage device;
     a management table providing an initializing processing for the processing circuit; and
   a third processor configured to;
   read the prescribed data from the storage device and write the prescribed data to the first storage area and the second storage area,
   update the prescribed data of the second storage area when receiving an updating request of the prescribed data from the second processor,
   read the prescribed data of the first storage area and send the prescribed data to the first processor when receiving a reading request of the prescribed data from the first processor, and
   wherein, in the initializing processing, the third processor writes in the management table a comment on whether the first processor is reading the prescribed data, and receives a response to the comment.

2. The information processing apparatus according to claim 1, wherein the third processor is further configured to;
   perform copy processing to copy updated data to the first storage area when the prescribed data of the second storage area is updated, and
   copy the updated data after access by the first processor ends when the access to the first storage area is being made by the first processor in the copy processing.

3. The information processing apparatus according to claim 2, wherein the third processor is further configured to;
   copy the updated data of the second storage area to the storage device.

4. The information processing apparatus according to claim 3, wherein the third processor is further configured to:
   copy the updated data to the first storage area after copying the updated data to the storage device.

5. The information processing apparatus according to claim 2, wherein
   the processing circuit includes an FPGA (Field Programmable Gate Array).

6. The information processing apparatus according to claim 2, wherein
the prescribed data is firmware used by the first processor.

7. A data control method by an information processing apparatus having:
a first processor,
a second processor, and
a storage device that manages prescribed data used by the first processor,
the information processing apparatus further having a processing circuit having:
a first storage area accessible by the first processor;
a second storage area accessible by the second processor and capable of processing access to the first storage area by the first processor and access to the second storage area by the second processor in parallel and accessing the storage device; and
a management table providing an initializing processing for the processing circuit,
the data control method comprising:
reading the prescribed data from the storage device and writing the prescribed data to the first storage area and the second storage area;
updating the prescribed data of the second storage area when receiving an updating request of the prescribed data from the second processor;
reading the prescribed data of the first storage area and send the prescribed data to the first processor when receiving a reading request of the prescribed data from the first processor,
writing, in the initializing processing, in the management table a comment on whether the first processor is reading the prescribed data, and receiving a response to the comment form the management table.

8. A non-transitory computer-readable medium storing a data control program performed by a computer having:
a first processor,
a second processor, and
a storage device that manages prescribed data used by the first processor, wherein
the computer further has:
a processing circuit having a first storage area accessible by the first processor;
a second storage area accessible by the second processor and capable of processing access to the first storage area by the first processor and access to the second storage area by the second processor in parallel and accessing the storage device;
a management table providing an initializing processing for the processing circuit; and
a third processor,
the data control program causes the computer to:
read the prescribed data from the storage device and write the prescribed data to the first storage area and the second storage area;
update the prescribed data of the second storage area when receiving an updating request of the prescribed data from the second processor; and
read the prescribed data of the first storage area and send the prescribed data to the first processor when receiving a reading request of the prescribed data from the first processor,
wherein, in the initializing processing, the third processor writes in the management table a comment on whether the first processor is reading the prescribed data, and receives a response to the comment.

* * * * *